United States Patent

Damon

[15] 3,654,762
[45] Apr. 11, 1972

[54] CONTROL ASSEMBLY
[72] Inventor: Gerald D. Damon, Plymouth, Mich.
[73] Assignee: Eaton Corporation
[22] Filed: Apr. 16, 1970
[21] Appl. No.: 33,126

Related U.S. Application Data

[62] Division of Ser. No. 715,655, Mar. 25, 1968, Pat. No. 3,517,790.

[52] U.S. Cl. .............................................. 60/53 R, 60/52 B
[51] Int. Cl. ........................................................ F16d 31/06
[58] Field of Search .............................. 60/53 R, 52 B, 52 VS

[56] References Cited

UNITED STATES PATENTS 3,171,255  3/1965  Lauck ................................. 60/53 R
3,224,197  12/1965  Lauck ................................. 60/53 R Primary Examiner—Edgar W. Geoghegan
Attorney—Yount, Flynn & Tarolli

[57] ABSTRACT

Disclosed herein is an actuator means for use in a vehicle having a support surface engaging drive means, an engine, and hydrostatic transmission means for transmitting power from the engine to the drive means. The actuator means is responsive to operation of the brakes of the vehicle to render the hydrostatic transmission incapable of transmitting power. A lock assembly is provided for releasably locking the actuator means in an operated condition. A lock release means operates the lock assembly to a release condition in response to operation of a control assembly for the hydrostatic transmission to a neutral condition.

1 Claims, 2 Drawing Figures

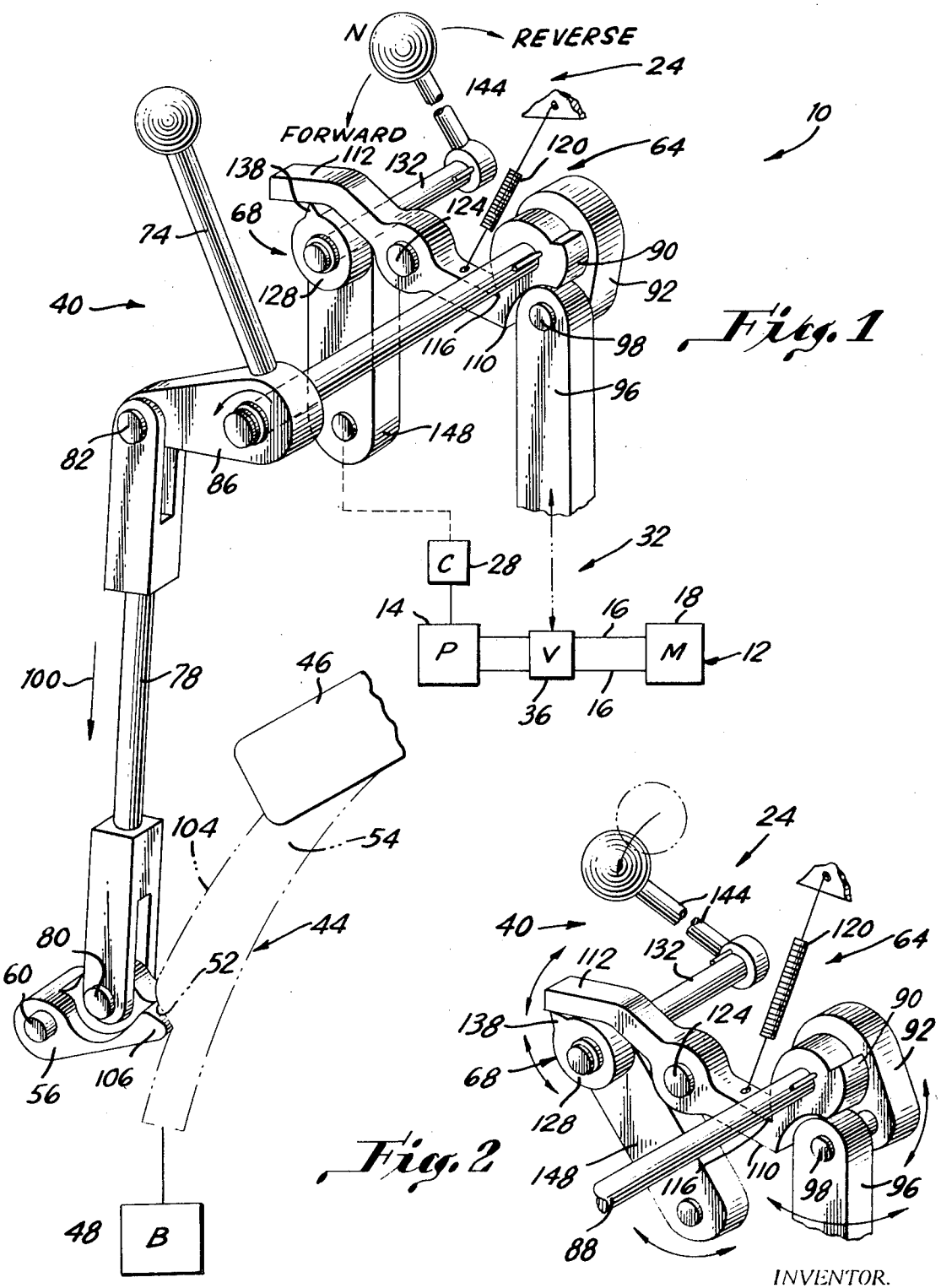

CONTROL ASSEMBLY

This application is a division of my earlier application Ser. No. 715,655, filed Mar. 25, 1968, now U.S. Pat. No. 3,517,790, issued June 30, 1970, for "Control Assembly."

During the operation of many vehicles having a hydrostatic transmission, a throttle for an engine associated with the hydrostatic transmission is maintained in a selected position. The speed of movement of the vehicle is regulated by a control assembly which is selectively operable to vary a ratio of input speed to output speed for the hydrostatic transmission. When such a vehicle is to be stopped, it is necessary to both operate the brakes of the vehicle and to operate the control assembly to a neutral condition to interrupt the transmission of power by the hydrostatic transmission. Thus, effective braking of these prior art vehicles requires two separate operations, the actuation of the brakes of the vehicle and the actuation of the control assembly for the hydrostatic transmission to a neutral condition.

Therefore, it is an object of this invention to provide an assembly responsive to operation of the brakes of a vehicle for rendering a hydrostatic transmission inoperative for transmitting power.

Another object of this invention is to provide an assembly in accordance with the preceding paragraph and which further includes lock means for releasably locking the assembly in an operated condition in which the hydrostatic transmission is inoperative for transmitting power and release means for operating the lock means to release the assembly in response to adjustment of the hydrostatic transmission to a neutral condition.

Another object of this invention is to provide an assembly for controlling the operation of a hydrostatic transmission, the assembly comprising control means operable between a neutral position in which the hydrostatic transmission is ineffective for transmitting power from an engine and a plurality of operated conditions in which the hydrostatic transmission is effective to transmit power from the engine, dump means operable from one condition to another condition in which the hydrostatic transmission is incapable of transmitting power, actuator means for operating the dump means from the one condition to the other condition, and lock means for locking the dump means in the other condition upon operation of the actuator means when the control means is one of the operated conditions, wherein the lock means is responsive to operation of the control means to the neutral condition to release the dump means for operation to the one condition from the other condition.

Another object of this invention is to provide a vehicle having support surface engaging drive means, and engine, hydrostatic transmission means for transmitting power from the engine to the drive means, and brake means for retarding operation of the drive means, wherein the improvement comprises dump means operable to render the hydrostatic transmission incapable of transmitting power and actuator means operatively associated with the dump means and the brake means for operating the dump means to render the hydrostatic transmission incapable of transmitting power upon operation of the brake means.

These and other objects and features of the invention will become more apparent upon a consideration of the following description taken in connection with the accompanying drawings wherein:

FIG. 1 is a schematic illustration of one embodiment of the invention wherein a control system is operated in response to the operation of the brakes of a vehicle to render a hydrostatic transmission incapable of transmitting power, the control system being shown in a normal or unoperated condition in which the hydrostatic transmission is capable of transmitting power; and FIG. 2 is a schematic illustration of a portion of the control system in an operated condition wherein the associated hydrostatic transmission is incapable of transmitting power.

This invention relates to a control system which is selectively operable to render a hydrostatic transmission inoperative for transmitting power. A lock assembly is associated with the control system for releasably locking the control system in an operated condition. A lock release means is provided for operating the lock assembly in response to operation of the hydrostatic transmission to a neutral condition. The control system is advantageously operated in response to operation of the brake assembly for a vehicle to thereby render the hydrostatic transmission inoperative for transmitting power upon operation of the brake assembly.

Although the present invention is feasible in many different environments, FIG. 1, illustrates a control system 10 embodying the invention in connection with a hydrostatic transmission 12 mounted on a vehicle for transmitting power from an engine of a vehicle to support surface engaging drive means (not shown). The hydrostatic transmission 12 includes a pump section 14, of well known construction, which is driven by the engine of the vehicle to transmit fluid under pressure through hydraulic circuitry 16 to a motor section 18 of the hydrostatic transmission. The motor section 18 is drivingly connected to support surface engaging drive means for the vehicle to operate the drive means to move the vehicle along the support surface.

The speed at which the vehicle moves along the support surface is regulated, in part, by a control assembly 24 which is operatively connected with the pump section 14 of the hydrostatic transmission 12 through a hydraulic control means 28. The control assembly 24 is selectively operable from a neutral condition in which the hydrostatic transmission is ineffective for transmitting power from the engine to a plurality of operated conditions in which the hydrostatic transmission is effective for transmitting power. Operation of the control assembly 24 from the neutral position shown in FIG. 1 to either a forward or reverse operated position, as indicated by the arrows in FIG. 1, results in the "swash" angle of the pump 14 being changed by operation of the hydraulic control assembly 28 to vary the ratio of input speed to output speed, or speed ratio, for the hydrostatic transmission 12 in a well known manner. The construction of the hydrostatic transmission 12 is well known to those skilled in the art and can take many different forms, for example the forms set forth in U.S. Pat. No. 3,142,964 to Thoma et al. and application Ser. No. 645,194 filed June 12, 1967 by Edward J. Bojas. Therefore, it is believed that further discussion of the construction of the hydrostatic transmission 12 is not required at this time.

A disabling or dump assembly 32 is provided in association with the hydrostatic transmission 12 for rendering the hydrostatic transmission incapable of transmitting power. The dump assembly 32 includes a valve 36 which is connected in fluid communication by the hydraulic circuitry 16 with both the pump section 14 and motor section 18 of the hydrostatic transmission 12. The valve 36 is selectively operable by an actuator assembly 40 to short circuit the hydraulic circuitry 16 of the hydrostatic transmission 12. This short circuiting of the hydraulic circuitry 16 renders the pump section 14 incapable of transmitting fluid under pressure to the motor section 18 of the hydrostatic transmission.

It should be noted that while both adjusting the hydrostatic transmission to a neutral condition and dumping the hydrostatic transmission render the hydrostatic transmission inoperative for transmitting power in the usual manner, adjusting the hydrostatic transmission to the neutral condition renders the hydrostatic transmission ineffective for transmitting power from the engine. On the other hand, opening of the valve 36 short circuits the hydraulic circuitry 16 and renders the hydrostatic transmission incapable of transmitting power either from or to the engine. This prevents the motor section 18 from being operated as a pump to transmit power to the pump section 14 and damaging the hydrostatic transmission 12 when the vehicle is coasting or moving under the influence of means other than the engine of the vehicle. It is anticipated that the valve 36 could, if desired, be operated to exhaust the hydrostatic transmission 12 to a reservoir in a manner set forth in an application filed by Robert B. Lauck entitled Hydrostatic Transmission Control System.

A brake assembly 44 is provided for retarding movement of the vehicle in a well known manner. The brake assembly 44 includes a brake pedal 46 which is selectively actuatable to operate the brakes of the vehicle, indicated schematically at 48, to retard the forward movement of the vehicle in a well known manner. A cam surface 52 is provided on a support shaft or member 54 which is connected to the brake pedal 46. Upon actuation of the brake pedal 46, the cam surface 52 pivots a follower lever or member 56 in a clockwise direction (as viewed in FIG. 1) about a pivot mounting 60 to operate the actuator assembly 40. This operation of the actuator assembly 40 results in the dump assembly 32 being operated to render the hydrostatic transmission 12 incapable of transmitting power. Thus, the actuator assembly 40 is responsive to operation of the brake assembly 44 to operate the dump assembly 32 to thereby interrupt the transmission of power from the motor of the vehicle to the support surface engaging drive means for the vehicle contemporaneously with the operation of the vehicle brakes 48.

A lock assembly 64 is provided for releasably locking the dump assembly 32 in an operated condition upon operation of the brake assembly 44 with the control assembly 24 in an operated condition. Accordingly, when the brake assembly 44 is actuated with the control assembly 24 in a forward operated condition, as shown in FIG. 2, the lock assembly 64 is operated from the released condition of FIG. 1 to the locking condition of FIG. 2 upon operation of the actuator assembly 40 in response to the operation of the brake assembly 44. The lock assembly 64 then holds the dump assembly 32 in the operated condition until the control assembly 24 is operated to the neutral condition of FIG. 1.

Operation of the control assembly 24 to a neutral condition from the forward operated condition of FIG. 2, with the lock assembly 64 in the locked condition of FIG. 2, operates a lock release assembly 68 to move the lock assembly 64 from the locking condition of FIG. 2 to the release condition of FIG. 1. The lock release assembly 68 insures that the dump assembly 32 is not moved from the operated condition to the normal or unoperated condition unless the hydrostatic transmission 12 is first adjusted to a neutral condition wherein the hydrostatic transmission is ineffective for transmitting power from the engine of the vehicle to the support surface engaging drive means of the vehicle. This prevents the vehicle from suddenly lurching or jerking forwardly upon operation of the dump assembly 32 to its normal condition, which would occur if the dump assembly was operated to its normal condition with the engine of the vehicle running and the hydrostatic transmission 12 adjusted to transmit power from the engine to the support surface engaging drive means.

In view of the foregoing description, it can be seen that the actuator assembly 40 operates the dump assembly 32 in response to actuation of the brake assembly 44 to interrupt the transmission of power by the hydrostatic transmission contemporenously with the operation of the brakes of the vehicle to thereby facilitate retarding movement of the vehicle. A lock assembly 64 is provided for locking the dump assembly 32 in an operated condition until the control assembly 24 is moved to a neutral position. Movement of the control assembly 24 to the neutral position operates the lock release assembly 68 to move the lock assembly 64 to a release condition and thereby enable the dump assembly 32 to be operated to its normal condition, wherein the hydrostatic transmission 12 is capable of transmitting power between the engine and support surface engaging drive means for the vehicle, only when the hydrostatic transmission 12 is in the neutral condition. A dump return lever 74 is provided for operating the actuator assembly 40 to return the dump assembly 32 to its normal condition wherein the hydrostatic transmission 12 is capable of transmitting power.

As was previously explained, the actuator assembly 40 is operated in response to actuation of the brake assembly 44 to operate the dump assembly 32. To this end, the actuator assembly 40 includes a link 78 which is pivotally connected at 80 to the follower lever 56. An opposite end of the link 78 is pivotally connected at 82 to a lever 86 which is fixedly secured to a rock shaft 88. The opposite end of the rock shaft 88 is fixedly connected to a lock member or section 90 and to a dump lever 92. A valve or dump link 96 is pivotally connected at 98 to a lever 92 and functions to operatively connect the actuator assembly 40 to the valve 36 of the dump assembly 32.

Upon operation of the brake assembly 44, the cam surface 52 on the brake pedal stem 54 pivots the actuator lever 56 in a clockwise direction about the pivot connection 60 to move the link 78 downwardly, as indicated by the arrow 100 in FIG. 1. This downward movement of the link 78 rotates the rock shaft 88 through the lever 86 to move the dump lever 92 and link 96 from the normal position of FIG. 1 to the operated position of FIG. 2. The movement of the dump link 96 operates the valve 36 of the dump assembly 32 to short circuit the hydraulic circuitry 16 of the hydrostatic transmission 12 to thereby render the hydrostatic transmission incapable of transmitting power. The actuator assembly 40 is maintained in the operated condition of FIG. 2 by engagement of a longitudinally extending surface 104 of the pedal shaft 54 with a nose portion 106 of the follower lever 56. This engagement between the surface 104 and follower lever 56 acts as an interlock to lock the actuator assembly 40 against movement from the operated condition of FIG. 2 to the normal condition of FIG. 1 while the brake assembly 44 is operated.

In accordance with the preceeding description, the lock assembly 64 releasably locks the dump assembly 32 in the operated condition when the brake assembly 44 is actuated with the control assembly 24 in operated condition. Therefore, actuation of the brake assembly 44 with the control assembly 24 in a forward operated condition, as shown in FIG. 2, results in the rock shaft 88 being moved in a counterclockwise direction from the position shown in FIG. 1 to the position shown in FIG. 2. A forward or nose portion 110 of a lock pawl or member 112 then engages a stop section or shoulder 116 on the lock section or member 90 to retain the rock shaft 88 against clockwise rotation back to the initial or normal position of FIG. 1. A biasing spring 120 is secured to the pawl 64 to rotate the lock pawl about a pivot mounting 124 upon movement of the lock section 90 to the operated condition of FIG. 2 to thereby move the nose portion 110 into engagement with the stop shoulder 116.

The lock assembly 64 is actuated from the locking condition of FIG. 2 to the release condition of FIG. 1 by the lock release assembly 68. The lock release assembly 68 includes a lock reference cam 128 which is fixedly connected to a shaft 132 of the control assembly 24. When the control assembly 24 is actuated from the operated condition of FIG. 2 to the neutral condition of FIG. 1, a radially projecting nose portion 138 of the lock release cam 128 pivots the lock pawl 112 from the locking position of FIG. 2 to the release position of FIG. 1. This movement of the lock pawl 112 pivots the nose portion 110 of the lock pawl out of engagement with the stop section 116 to enable the rock shaft 88 to be rotated in a clockwise direction from the operated position of FIG. 2 to the normal or unoperated condition of FIG. 1 by means of the dump return lever 74. This movement of the rock shaft 88 moves the link 96 from the position shown in FIG. 2 to the position shown in FIG. 1 to operate the valve 36 of the dump assembly 32 to the normal or closed position wherein the hydrostatic transmission 12 is again capable of transmitting power.

The control assembly 24 includes a manually operable actuator lever 144 which is selectively movable from the neutral position of FIG. 1 to either a forward or reverse operated position. When the actuator lever 144 is moved to a forward operated position the hydrostatic transmission 12 is operated in one direction to drive the vehicle forwardly at a rate which is proportional to the distance or extent of movement of the actuator level 144 in the forward direction from the neutral position. Similarly, when the actuator lever 144 is moved to a reverse operated position from the neutral position of FIG. 1, the hydrostatic transmission is operated in an opposite direction to move the vehicle backwards, the rate at which the vehicle moves backwards being proportional to the distance which the lever 144 is moved from the neutral position. The control assembly 24 is connected to the hydrostatic transmission 12 by a lever 148 which is fixedly connected to the shaft 132 to which the actuator lever 144 is secured. The structure of the control assembly 24 is more fully disclosed in the aforementioned application filed by Robert B. Lauck entitled Hydrostatic Transmission Control System. For purposes of the present disclosure, it is sufficient to note that the control assembly 24 must be moved to the neutral position, wherein the nose 138 of the lock release cam 128 is in the position shown in FIG. 1, to move the lock assembly 64 to the release position.

When the lock assembly 64 is in the release position, the dump return lever 74 can be manually actuated to operate the dump assembly 32 from an operated condition to the normal condition wherein the hydrostatic transmission 12 is capable of transmitting power. When the lock assembly 64 is in the operated position, the dump return lever 74 is locked against moving the dump assembly 32 from the operated condition. When the control assembly 24 is operated to the neutral condition, the lock release assembly 68 actuates the lock assembly 64 to the normal or release condition. Thus, the lock assembly 64 cooperates with the lock release assembly 68 to insure that when the dump assembly 32 is actuated from the operated condition, wherein the hydrostatic transmission 12 is incapable of transmitting power, to the normal condition, wherein the hydrostatic transmission 12 is capable of transmitting power, only when the control assembly 24 is in the neutral condition so that the hydrostatic transmission 12 is ineffective for transmitting power. This prevents the vehicle from lurching or jerking ahead upon the operation of the dump assembly to its normal condition.

In view of the preceding description, it is apparent that I have provided a control system 10 which is responsive to the operation of the brake assembly 44 of a vehicle for rendering a hydrostatic transmission 12 of the vehicle incapable of transmitting power. This is accomplished by operating the dump or disabling assembly 32 by means of the actuator assembly 40. The lock assembly 64 is provided for releasably locking the control system in the operated condition until the control assembly 24 is operated to its neutral condition and the release assembly 68 operates the lock assembly 64 to release the actuator assembly 40 from movement from the operated condition to the normal or unoperated condition. Although the lock assembly 64 and release assembly 68 have been shown in conjunction with the actuator assembly 40, which is responsive to the operation of the brake assembly 44, it is contemplated that the lock assembly 64 and release assembly 68 could be used with other actuator assemblies for operating means other than the dump assembly 32 to render the associated hydrostatic transmission inoperative for transmitting power. It is also contemplated that the dump assembly 32 could, if desired, be operated by an electrical actuator assembly upon operation of the brake assembly.

Although a preferred embodiment of the invention has been illustrated in FIGS. 1 and 2, it will be apparent to those skilled in the art that the particular structure of the control system can be changed or modified without departing from the true spirit and scope of the invention. Therefore, it is intended to cover by the appended claims any such changes and modifications as come within the true spirit and scope of the invention.

What is claimed is:

1. An assembly for controlling the operation of a hydrostatic transmission, said assembly comprising control means operable between a neutral condition in which said hydrostatic transmission is ineffective for transmitting power from an engine and a plurality of operated conditions in which said hydrostatic transmission is effective to transmit power from said engine, dump means operable from one condition in which said hydrostatic transmission is capable of transmitting power to another condition in which said hydrostatic transmission is incapable of transmitting power, actuator means for operating said dump means from said one condition to said other condition, lock means for locking said dump means in said other condition when said control means is in one of said operated conditions, and means responsive to operation of said control means to said neutral condition to release said lock means to enable said dump means to return to said one condition.

* * * * *